United States Patent [19]

Nemoto

[11] 3,878,408

[45] Apr. 15, 1975

[54] QUARTZ CRYSTAL TIMEPIECE HAVING TUNING CAPACITOR DEVICE

[75] Inventor: Isao Nemoto, Suwa, Japan

[73] Assignee: Kabushiki Kaisha Suwa Seikosha, Tokyo, Japan

[22] Filed: Apr. 6, 1973

[21] Appl. No.: 348,574

[30] Foreign Application Priority Data

Apr. 6, 1972 Japan ................................ 47-33839
May 2, 1972 Japan ................................ 47-44026

[52] U.S. Cl................ 310/8.1; 310/8.9; 317/249 R; 331/116 R; 331/158; 58/23 V

[51] Int. Cl.............................................. H01v 7/00

[58] Field of Search .................. 310/8, 8.1, 8.2, 8.9; 331/116 R, 176, 179, 158–164; 317/249 R; 58/23 TF, 23 V

[56] References Cited

UNITED STATES PATENTS

| | | | |
|---|---|---|---|
| 1,396,030 | 11/1921 | Dubilier | 317/249 R |
| 1,616,832 | 2/1927 | Sprague | 317/249 R |
| 2,858,490 | 10/1958 | Simkulet et al. | 317/249 R |
| 3,404,298 | 10/1968 | Roberts | 310/8.9 |
| 3,737,805 | 6/1973 | Shimodaira et al. | 317/249 R |
| 3,754,152 | 8/1973 | Koehler | 310/8.1 |

*Primary Examiner*—Mark O. Budd
*Attorney, Agent, or Firm*—Blum, Moscovitz, Friedman & Kaplan

[57] ABSTRACT

The oscillator circuit of a quartz crystal timepiece is provided with a tuning capacitor device consisting of a stepped variable capacitor and a continuously variable capacitor connected in parallel with each other and in series with said quartz crystal.

3 Claims, 6 Drawing Figures

QUARTZ CRYSTAL TIMEPIECE HAVING TUNING CAPACITOR DEVICE

BACKGROUND OF THE INVENTION

This invention relates to quartz crystal timepieces, and in particular, to the oscillator circuits thereof. The regulation of the accuracy of such timepieces is achieved by adjusting the capacitance of a capacitor connected in series with the quartz crystal. Over the passage of time, and due to shocks, quartz crystal timepieces require such regulation. In the art, the use of continuously variable capacitors for such regulation has been proposed. However, a continuously variable capacitor of sufficient size would generally be of the rotary type and would occupy too large a space for a practical electronic wrist watch. It has been further suggested to overcome this disadvantage, to replace the single large-sized continuously variable capacitor by a relatively small-sized continuously variable capacitor and a fixed capacitor. However, this approach requires the changing of the fixed capacitor to obtain the range of adjustment required, a costly and inconvenient approach. By providing a stepped variable capacitor connected in parallel with a continuously variable capacitor, the foregoing disadvantages are avoided.

SUMMARY OF THE INVENTION

Generally speaking, in accordance with the invention, a quartz crystal timepiece is provided with a continuously variable capacitor, a stepped variable capacitor connected in parallel with said continuously variable capacitor, said parallel combination being connected in series with the quartz crystal. The capacitance difference between respective steps of the stepped variable capacitor is not more than the maximum variable capacitance of the continuously variable capacitor.

Said stepped and continuously variable capacitors may be formed as a unit, sharing at least one common electrode.

Accordingly, it is an object of the invention to provide a simple mechanism for adjusting the oscillating period of a quartz oscillator to thereby adjust the accuracy of a quartz crystal timepiece.

A further object of the invention is to provide a compact variable capacitor having a large variable capacitance range.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
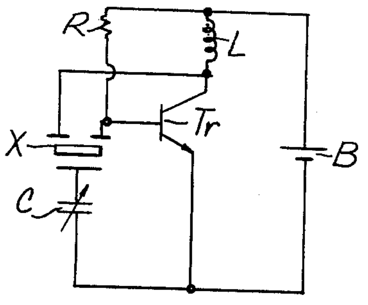
FIG. 1 PRIOR ART
FIG. 1 is a circuit diagram of a prior art quartz crystal oscillating circuit.

Referring first to FIG. 1, the prior art quartz oscillating circuit depicted includes a quartz crystal vibrator X, the oscillation of which is sustained by a driving circuit consisting of a transistor Tr having a load inductor L connected to the collector thereof. A battery B is connected between the emitter of said transistor and said load inductor. A base resistor R is connected between the base of said transistor and said load inductor. One terminal of said quartz crystal oscillator is connected to the base of said transistor while a second terminal is connected to the collector of said transistor. A variable tuning capacitor C is connected between a third terminal of said oscillator and the emitter of said transistor.

Figure 2:
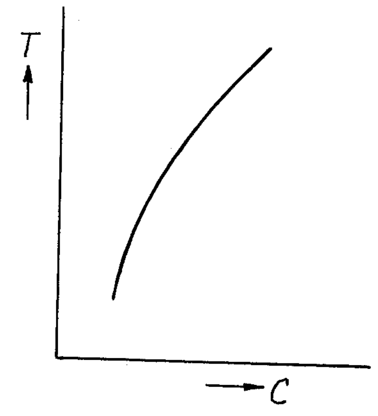
FIG. 2 is a plot of the relation between oscillating period T of a quartz oscillator and capacitance C of a capacitor in the quartz oscillating circuit.

As shown in FIG. 2, the oscillating period T of the quartz crystal varies with the capacitance C in a known manner. The regulation of the accuracy of the timepiece within a limited range, for example within a 5-second monthly rate, is performed by varying the capacitance of capacitor C, taking advantage of the C-T relation depicted in FIG. 2. As indicated in FIG. 2, capacitor C must have a large range to render usable a quartz oscillator or a circuit element having a period of oscillation significantly different from the desired period. In the art, variable capacitor C was generally a continuously variable capacitor. Such continuously variable capacitors are generally of the rotary type, but a large-sized continuously variable capacitor of the rotary type and having a large capacitance range cannot be utilized in a small-sized instrument such as an electronic wrist watch due to the area available.

Figure 3:
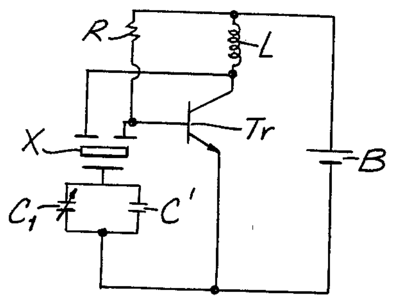
FIG. 3 PRIOR ART
FIG. 3 is a circuit diagram of a further prior art quartz crystal oscillator circuit.

One proposed prior art solution to this problem is illustrated in FIG. 3 wherein an oscillator circuit identical to the circuit of FIG. 1 as depicted, except that the single variable capacitor C is replaced by the parallel combination of a fixed capacitor C' and a variable capacitor $C_1$. The values would be selected to bear a relation to the quartz crystal and other circuit elements. However, if the oscillating period of the oscillator varies greatly due to the dropping of the watch, the fixed capacitor C' must be replaced by a different fixed capacitor of a different value. The latter approach is burdensome and costly, both from the point of view of initial manufacture and post-sale service. The difficulties in manufacture are caused by the necessity of mounting the fixed capacitor so that it can be readily removed, while positioning the variable capacitor so that it can be readily adjusted. These criteria increase the number of parts required, as well as making it difficult to distribute the parts within the timepiece. Further, a large number of fixed capacitors of various values must be provided to the service men, further increasing costs.

Figure 4:
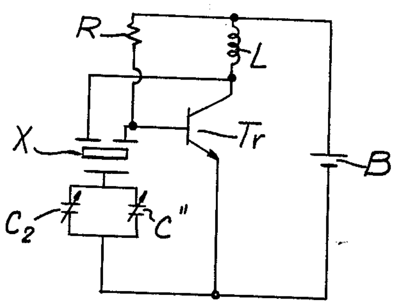
FIG. 4 is a circuit diagram of a quartz crystal oscillator circuit in accordance with the invention.

Referring now to FIG. 4, the oscillator circuit for incorporation in quartz crystal timepieces in accordance with the invention is depicted. In place of the continuously variable capacitor C of FIG. 1, or the parallel combination of the continuously variable capacitor $C_1$ and fixed capacitor C' of FIG. 3. The circuit in accordance with the invention is provided with the parallel connection of a continuously variable capacitor $C_2$ and a stepped variable capacitor C'', which parallel elements are connected in series with the quartz crystal X.

As mentioned above, while a continuously variable capacitor of the rotary type is generally limited to a circular shape, thereby limiting the size which can be mounted within a wrist watch of limited space, a stepped variable capacitor is not limited in its shape. For this reason, a stepped variable capacitor having a large variable range of capacitance can be readily assembled in the limited space of a wrist watch by effective utilization of such space. If the capacitance difference of each step of the stepped variable capacitor C'' is set at less than the maximum variable capacitance of the continuously variable capacitor $C_2$, the capacitance of the combined arrangement can be continuously varied over a large range, resulting in easy regulation of timing of the timepiece. Since only a single type of stepped variable capacitor is required for all possible capacitor settings, the above-mentioned problems encountered in connection with the use of the fixed capacitor C' are not found in the arrangement in accordance with the invention.

Further, the arrangement offers the further advantage over the embodiment of FIG. 1 wherein a large continuously variable capacitor is provided. Such continuously variable capacitors are subject to changes in value when subjected to vibration or shock, thereby effecting the accuracy of the timepiece. The larger the continuously variable capacitor, the greater the variation in capacitance caused by vibration and shock. However, in the arrangement in accordance with the invention, the continuously variable capacitor is of a relatively small value so that the accuracy of the quartz crystal wrist watch incorporating such a device is stabilized and the adjustments required to compensate for changes in value of the variable capacitor due to vibration and shock can be readily made without inconvenience.

Figure 5:
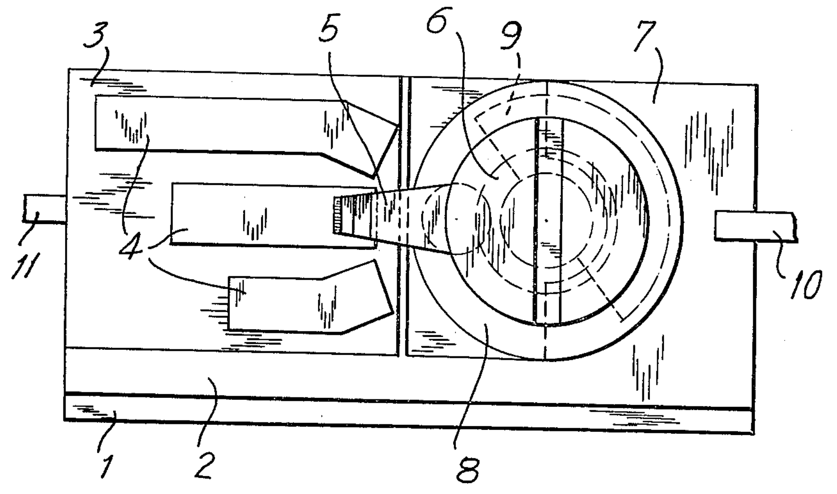
FIG. 5 is a top plan view of the variable capacitor of FIG. 4.
Figure 6:
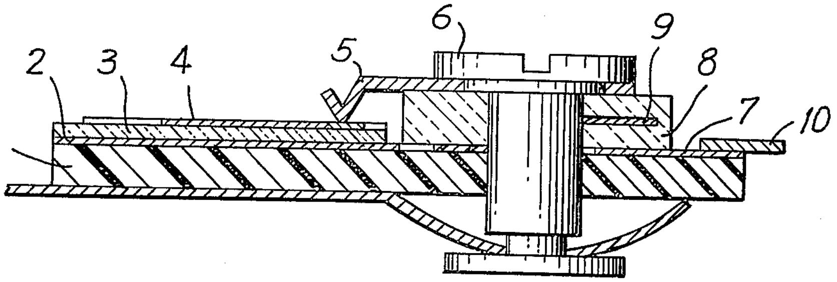
FIG. 6 is a sectional view of the variable capacitor of FIG. 5.

To further simplify the construction of a quartz crystal timepiece incorporating the oscillator circuit in accordance with the invention, it is desirable to provide a unified variable capacitor consisting of said continuously variable capacitor and stepped variable capacitor for the purposes of making the best use of the features of this arrangement in simplifying watch assembly and maintenance. Referring to FIGS. 5 and 6, one embodiment of such a unified variable capacitor in accordance with the invention is depicted. Said unified capacitor is provided with a base plate 1 on which is deposited a lower electrode 2 of the stepped variable capacitor portion electrically connected with the lower electrode 7 of the continuously variable capacitor portion. A layer of dielectric 3 is deposited on lower electrode 2, and three upper electrodes of different areas are mounted on the upper surface of dielectric 3 to form said stepped variable capacitor. A switching electrode terminal 5 is frictionally engaged between a rotary shaft 6 and a dielectric block of a continuously variable capacitor so that a portion thereof may be selectively engaged against one of the three upper electrodes 4 of the stepped variable capacitor portion. Rotary shaft 6 is mounted for rotation on base plate 1 and is formed of metal to provide a part of the electrical circuit. An upper electrode 9 having the shape of one-half of a donut is mounted on dielectric block 8 in electrical engagement with rotary shaft 6 and separated from lower electrode 7 by a portion of said dielectric. Both upper electrode 9 and rotary block 8 rotate as a unit about the axis defined by rotary shaft 6 together with said rotary shaft to continuously and selectively adjust the area of upper electrode 9 in overlapping relation with lower electrode 7. The portion of lower electrode 7 in registration with dielectric block 8 also has the shape of one-half of a donut, the balance of the surface of base plate 1 in registration with dielectric block 8 being exposed and free of a lower electrode.

As noted above, lower electrodes 7 and 2 are electrically connected, and an external terminal 10 is electrically connected thereto. An external terminal 11 is electrically connected to rotary shaft 6, and through said rotary shaft to upper electrodes 4 and 9 of the stepped variable capacitor portion and continuously variable capacitor portion of the device.

Thus, in the compact variable capacitor of FIGS. 5 and 6, the capacitance of the stepped variable capacitor portion is varied according to the positioning of switching electrode terminal 5, while that of the continuously variable capacitor portion is varied to the rotation of rotary shaft 6. In other words, the capacitance can be widely varied through the operation of said two components. The entire device may be connected to the remaining circuitry of the oscillator through terminals 10 and 11, and can be permanently fixed in the circuit by soldering or the like without the necessity for screws, pins or the like as a connecting means between terminals 10 and 11 and the balance of the oscillator circuit. The variable capacitor in accordance with the invention need not be removed from the timepiece during normal service due to the wide range of adjustment incorporated therein.

Accordingly, it can be seen that the unified variable capacitor in accordance with the invention overcomes the advantages in the prior art, and when utilized in a quartz crystal wrist watch or the like, offers meaningful advantages in design, manufacture, and post-sales service.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a circuit particularly suited for producing oscillating signals and including a parallel coupled continuous variable capacitor and a step variable capacitor, the improvement comprising said step variable capacitor, and continuously variable capacitor being mounted to a base plate, first and second lower electrodes mounted on said base plate, and means mounted on said base plate electrically connecting said lower electrodes, said step variable capacitor being defined by a fixed dielectric mounted on said first lower electrode, and a plurality of upper electrodes mounted on said fixed dielectric, each of said electrodes having a different area overlapping said lower electrodes, a rotatable electrically conductive first switch contact member selectively positionable in electrical engagement with one of said upper electrodes, and said continuously variable capacitor being defined by an electrically conductive shaft rotatably mounted on said base plate out of electrical engagement with said first and second lower electrodes; a rotatable dielectric mounted for rotation with said shaft partly overlapping said second lower electrodes; a rotatable upper electrode supported by said rotatable dielectric in variable overlapping relation to said second lower electrode and electrically connected to shaft; said switch contact being supported by and electrically connected to said electrically conductive shaft.

2. A circuit as claimed in claim 1, wherein said oscillating circuit includes a quartz crystal vibrator connected in series with the parallel connection of said step variable capacitor and continuously variable capacitor.

3. A circuit as claimed in claim 2, wherein each capacitance difference between respective steps of said step variable capacitor is of a value not more than the maximum variable capacitance of the continuously variable capacitor.

* * * * *